US012195899B2

(12) United States Patent
Kobayashi et al.

(10) Patent No.: US 12,195,899 B2
(45) Date of Patent: Jan. 14, 2025

(54) PROCESSING DATA GENERATION DEVICE, NON-TRANSITORY COMPUTER-READABLE MEDIUM, AND SEWING MACHINE

(71) Applicant: BROTHER KOGYO KABUSHIKI KAISHA, Nagoya (JP)

(72) Inventors: Harumi Kobayashi, Nagoya (JP); Satomi Yamamoto, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 157 days.

(21) Appl. No.: 17/931,721

(22) Filed: Sep. 13, 2022

(65) Prior Publication Data

US 2023/0002946 A1 Jan. 5, 2023

Related U.S. Application Data

(63) Continuation of application No. PCT/JP2020/014652, filed on Mar. 30, 2020.

(51) Int. Cl.
*D05B 19/04* (2006.01)
*B26D 5/00* (2006.01)

(52) U.S. Cl.
CPC ............. *D05B 19/04* (2013.01); *B26D 5/005* (2013.01); *B26D 2005/002* (2013.01)

(58) Field of Classification Search
CPC ........ D05B 19/04; D05B 19/00; D05B 19/02; D05B 19/10; D05B 19/16; B20D 5/005; B20D 2005/002
See application file for complete search history.

(56) References Cited

U.S. PATENT DOCUMENTS 7,814,832 B2 * 10/2010 Franz ........................ D06P 5/30 101/35
2007/0261621 A1 * 11/2007 Suzuki ..................... D05C 9/02 112/220

(Continued)

FOREIGN PATENT DOCUMENTS

JP S63-180435 A 7/1988
JP H08309054 A * 11/1996

(Continued)

OTHER PUBLICATIONS

Sep. 29, 2022 International Preliminary Report on Patentability issued in International Application No. PCT/2020/014652.

(Continued)

*Primary Examiner* — Ismael Izaguirre
(74) *Attorney, Agent, or Firm* — Oliff PLC

(57) ABSTRACT

A processing data generation device includes a processor and a memory. The memory is configured to store computer-readable instructions that, when executed by the processor, instruct the processor to perform processes. The processes include acquiring processing of acquiring a pattern represented by a contour, division processing of dividing the pattern into a plurality of pattern pieces, and offset setting processing of setting an offset line disposed at a position separated to an outside, from an adjacent portion, by a predetermined distance. The processes include processing line setting processing of setting, for each of the plurality of pattern pieces, a processing line including the offset line and surrounding a pattern piece and processing line processing of generating processing line processing data, for each of the plurality of pattern pieces, for processing a sheet-shaped workpiece along the processing line, using a processing device configured to perform processing on the workpiece.

11 Claims, 10 Drawing Sheets

(56) References Cited

U.S. PATENT DOCUMENTS

| | | | | |
|---|---|---|---|---|
| 2016/0375718 | A1* | 12/2016 | Van Garsse | G06F 3/1251 52/311.1 |
| 2018/0177256 | A1 | 6/2018 | Feliu De La Pena Calvo | |
| 2018/0298535 | A1* | 10/2018 | Kamihira | D05B 19/08 |
| 2019/0001515 | A1* | 1/2019 | Nishizaki | B26D 1/60 |

FOREIGN PATENT DOCUMENTS

| | | | |
|---|---|---|---|
| JP | H11-226276 | A | 8/1999 |
| JP | H11-253675 | A | 9/1999 |
| JP | 2018-525540 | A | 9/2018 |

OTHER PUBLICATIONS

Jun. 30, 2020 International Search Report issued in Patent Application No. PCT/JP2020/014652.

* cited by examiner

PROCESSING DATA GENERATION DEVICE, NON-TRANSITORY COMPUTER-READABLE MEDIUM, AND SEWING MACHINE

REFERENCE TO RELATED APPLICATIONS

This application is a continuation application of International Application No. PCT/JP2020/014652, filed Mar. 30, 2020, the disclosure of which is herein incorporated by reference in its entirety.

BACKGROUND ART

The present disclosure relates to a processing data generation device, a non-transitory computer-readable medium, and a sewing machine.

Based on drawing pattern data representing a pattern for patchwork, a known pattern data processing device divides the drawing pattern into a plurality of divided patterns, provides a margin of a predetermined width between the adjacent divided patterns, and prints the plurality of divided patterns on sewing objects. A user can obtain the patchwork by joining together the plurality of divided drawing patterns, by sewing the printed sewing objects so as to hide the margins.

DESCRIPTION

The above-described drawing pattern data processing device prints a boundary line representing a boundary between the divided pattern and the margin. The user causes the boundary lines to face each other, and sews along the boundary lines in a state in which the sewing objects are placed face to face. It is thus difficult to verify a position of the boundary line, and an operation to determine a sewing position such that the adjacent divided patterns are appropriately sewn together at the boundary line is complex.

An object of the present disclosure is to provide a processing data generation device, a non-transitory computer-readable medium, and a sewing machine that improve user convenience when creating a patchwork, compared to known art.

Embodiments of the broad principles derived herein provide a processing data generation device according to a first aspect of the present disclosure. The processing data generation device includes a processor and a memory. The memory is configured to store computer-readable instructions that, when executed by the processor, instruct the processor to perform processes. The processes include acquiring processing of acquiring a pattern represented by a contour, division processing of dividing the pattern into a plurality of pattern pieces. The processes include offset setting processing of setting an offset line, for each of two pattern pieces adjacent to each other from among the plurality of pattern pieces representing the pattern as a whole. The offset line is disposed at a position separated to an outside, from an adjacent portion, by a predetermined distance, the adjacent portion being a portion of the contour of one of the two pattern pieces. The adjacent portion is adjacent to another of the two pattern pieces. The outside is opposite, with respect to the contour of the first piece, to a region surrounded by the contour of the first piece. The processes include processing line setting processing of setting, for each of the plurality of pattern pieces, a processing line including the offset line and surrounding a pattern piece from among the plurality of pattern pieces and processing line processing of generating processing line processing data, for each of the plurality of pattern pieces, for processing a sheet-shaped workpiece along the processing line, using a processing device configured to perform processing on the workpiece.

The processing data generation device according to the first aspect of the present disclosure is configured to generate the processing data for causing the processing device to process the workpiece along the processing line. The processing device can process the workpiece along the processing line on the basis of the generate processing data. For example, using the workpiece processed in accordance with the processing data generated using the following procedure, a user can create a patchwork including contours that are aligned with the contours of the pattern as a whole. The user acquires a plurality of sewing object pieces cut along the shape of the processing line, on the basis of the workpiece processed along the processing line. The user places two of the sewing object pieces, which correspond to the two adjacent pattern pieces, face to face, and overlaps the ends of the sewing object pieces in accordance with the offset line. By sewing at a position of the predetermined distance from the ends of the sewing object pieces corresponding to the offset line, the user can sew together the two sewing object pieces at a position corresponding to the adjacent portions of the two adjacent pattern pieces. The user sews, in order, the plurality of sewing object pieces respectively corresponding to the plurality of pattern pieces. When the processing data generated by the processing data generation device is used to create the patchwork, it is not necessary for the user to check the position at which the sewing object pieces are sewn together. Thus, the processing data generation device contributes to improving convenience of the user when creating the patchwork, and in particular contributes to the efficiency of an operation to determine the position at which the two sewing object pieces corresponding to the two pattern pieces are sewn together.

Embodiments also provide a non-transitory computer-readable medium that stores computer-readable instructions that are executed by a processor of a sewing data editing device. The computer-readable instructions performing processes. The processes include acquiring processing of acquiring a pattern represented by a contour, division processing of dividing the pattern into a plurality of pattern pieces. The processes include offset setting processing of setting an offset line, for each of two pattern pieces adjacent to each other from among the plurality of pattern pieces representing the pattern as a whole. The offset line is disposed at a position separated to an outside, from an adjacent portion, by a predetermined distance, the adjacent portion being a portion of the contour of one of the two pattern pieces. The adjacent portion is adjacent to another of the two pattern pieces. The outside is opposite, with respect to the contour of the first piece, to a region surrounded by the contour of the first piece. The processes include processing line setting processing of setting, for each of the plurality of pattern pieces, a processing line including the offset line and surrounding a pattern piece from among the plurality of pattern pieces and processing line processing of generating processing line processing data, for each of the plurality of pattern pieces, for processing a sheet-shaped workpiece along the processing line, using a processing device configured to perform processing on the workpiece. The non-transitory computer-readable medium according to a second aspect of the present disclosure contributes to achieving the same effects as the processing data generation device according to the first aspect, by causing the processor of the processing data generation device to execute the instructions.

Embodiments further provide a sewing machine that includes a presser bar, a processor, and a memory. The presser bar is configured to press a sewing object from above. The presser foot is configured to be mounted to a lower end portion of the presser bar. The memory is configured to store computer-readable instructions that, when executed by the processor, instruct the processor to perform processes. The processes include acquiring processing of acquiring a pattern represented by a contour, division processing of dividing the pattern into a plurality of pattern pieces, and predetermined distance setting processing of setting a predetermined distance depending on a type of the presser foot mounted to the lower end portion of the presser bar. The processes include offset setting processing of setting an offset line, for each of two pattern pieces adjacent to each other from among the plurality of pattern pieces representing the pattern as a whole. The offset line is disposed at a position separated to an outside, from an adjacent portion, by the predetermined distance, the adjacent portion being a portion of the contour of one of the two pattern pieces. The adjacent portion is adjacent to another of the two pattern pieces. The outside is opposite, with respect to the contour of the first piece, to a region surrounded by the contour of the first piece. The processes include processing line setting processing of setting, for each of the plurality of pattern pieces, a processing line including the offset line and surrounding a pattern piece from among the plurality of pattern pieces and processing line processing of generating processing line processing data, for each of the plurality of pattern pieces, for processing a sheet-shaped workpiece along the processing line, using a processing device configured to perform processing on the workpiece. The sewing machine according to the third aspect of the present disclosure contributes to achieving the same effects as the processing data generation device according to the first aspect. Further, the sewing machine is configured to set the predetermined distance in accordance with the type of the presser foot mounted to the lower end of the presser bar. Thus, by acquiring the sewing object pieces using the workpiece processed in accordance with the processing data generated by the sewing machine, the sewing machine contributes to the user acquiring the sewing object pieces for which the margin is set that is appropriate for the presser foot.

Figure 1:
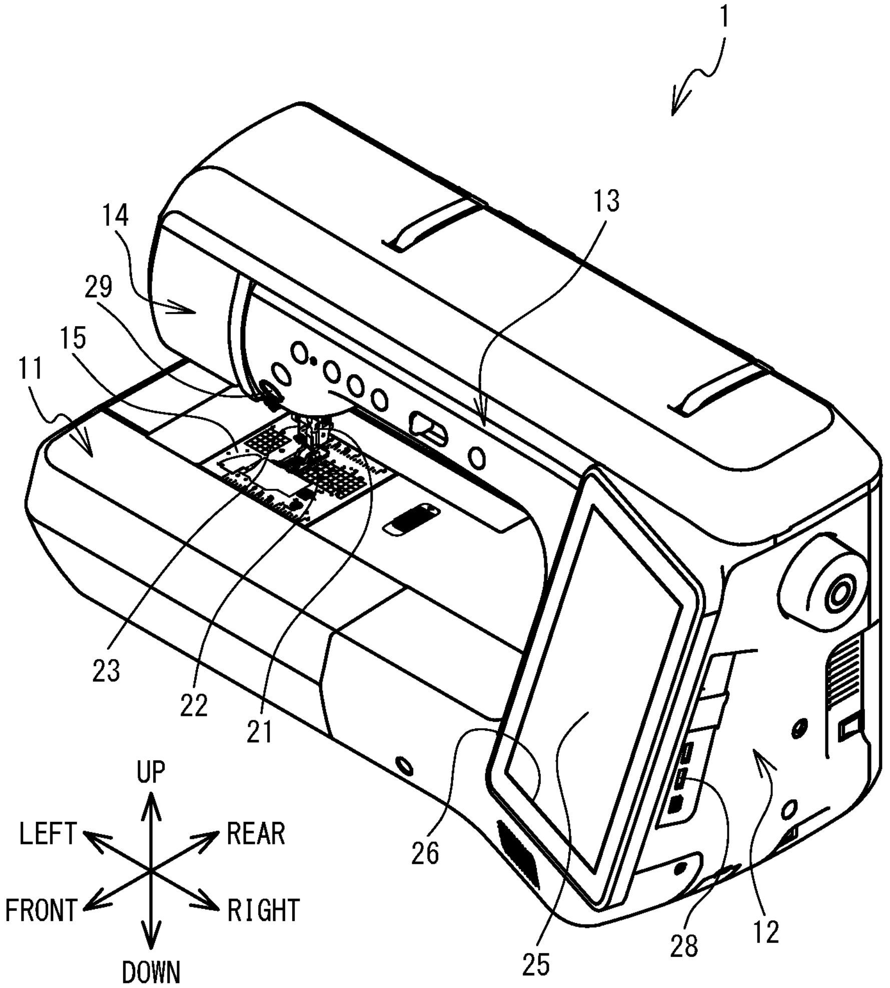
FIG. 1 is a perspective view of a sewing machine.

An embodiment of the present disclosure will be described with reference to the drawings. A physical configuration of a sewing machine 1 will be described with reference to FIG. 1. The up-down direction, the lower left direction, the upper right direction, the upper left direction, and the lower right direction of FIG. 1 are, respectively, the up-down direction, the front, the rear, the left, and the right of the sewing machine 1. In other words, a longitudinal direction of a bed 11 and an arm 13 is the left-right direction of the sewing machine 1. A direction in which a pillar 12 is disposed is the right. An extending direction of the pillar 12 is the up-down direction of the sewing machine 1.

Figure 2:
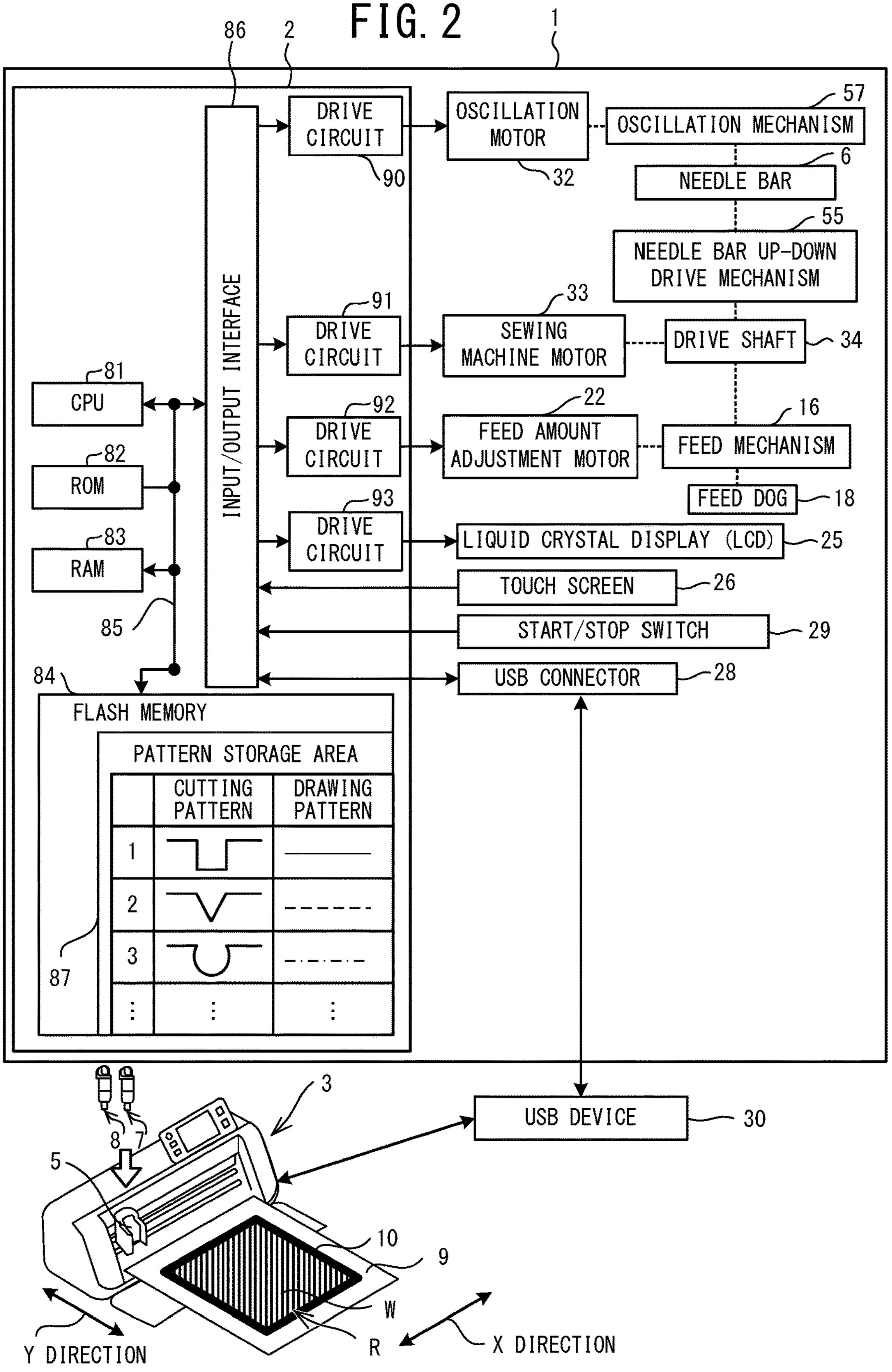
FIG. 2 is a block diagram showing an electrical configuration of the sewing machine.

The sewing machine 1 includes a function as a processing data generation device that generates processing data for causing a processing device 3 to be described later with reference to FIG. 2 to perform processing with respect to a sheet-shaped workpiece W. As shown in FIG. 1 and FIG. 2, the sewing machine 1 is provided with the bed 11, the pillar 12, the arm 13, and a head 14. The bed 11 is a base of the sewing machine 1 that extends in the left-right direction, and an upper surface of the bed 11 is provided with a needle plate 15. Below the needle plate 15 of the bed 11, a feed mechanism 16 is provided that is configured to convey a sewing object to the rear or to the front, by driving a feed dog 18. The pillar 12 is provided standing upward from the right end portion of the bed 11. A liquid crystal display (LCD) 25 and a touch screen 26 are provided at the front surface of the pillar 12. A USB connector 28 is provided at the right surface of the pillar 12. The arm extends to the left, facing the bed 11, from the upper end of the pillar 12. Various switches, including a start/stop switch 29, are provided at the front surface of the arm 13. The start/stop switch 29 is configured to be used to start or stop an operation of the sewing machine 1, that is, to input a command to start or stop sewing. The head 14 is a portion that is contiguous to the left leading end portion of the arm 13. A needle bar 6, a presser bar 21, a needle bar up-down drive mechanism 55, an oscillation mechanism 57, and the like are provided in the head 14. A sewing needle 23 is detachably mounted to the lower end of the needle bar 6. The presser bar 21 extends in the up-down direction to the rear of the needle bar 6, and a presser foot 22 is detachably mounted to the lower end of the presser bar 21. The needle bar up-down drive mechanism 55 drives the needle bar 6 up and down. The oscillation mechanism 57 causes the needle bar 6 to oscillate left and right.

An electrical configuration of the sewing machine 1 will be described, in order, with reference to FIG. 2. As shown in FIG. 2, a controller 2 of the sewing machine 1 is provided with a CPU 81, a ROM 82, a RAM 83, a flash memory 84, an input/output interface (I/O) 86, and the like. The CPU 81 is connected to the ROM 82, the RAM 83, the flash memory 84, and the input/output I/O 86 via a bus 85. The CPU 81 performs overall control of the sewing machine 1, and executes various arithmetic calculations and processing, including processing data generation processing and sewing guide processing to be described later, in accordance with various programs stored in the ROM 82. Although not shown in the drawings, the ROM 82 is provided with a plurality of storage areas including a program storage area. A storage area is provided in the RAM 83 that stores arithmetic processing results resulting from the arithmetic calculations and the like that are performed by the CPU 81. The flash memory 84 stores various setting values. The flash memory 84 includes a pattern storage area 87. The pattern storage area 87 stores cutting patterns and drawing patterns to be described later. Drive circuits 90 to 93, the touch screen 26, the start/stop switch 29, and the USB connector 28 are connected to the input/output I/O 86. A USB device (for example, a USB memory) 30 is configured to be connected to the USB connector 28. In a state in which the USB device 30 is connected to the USB connector 28, the controller 2 is configured to access each of storage areas provided in the USB device 30. The USB device 30 is configured to also be connected to a USB connector (not shown in the drawings) of the processing device 3 to be described later.

An oscillation motor 32 is connected to the drive circuit 90. The drive circuit 90 is configured to drive the oscillation motor 32 in accordance with a control signal from the CPU 81. The oscillation mechanism 57 is driven by the driving of the oscillation motor 32, and moves the needle bar 6 to the left and the right. A sewing machine motor 33 is connected to the drive circuit 91. The drive circuit 91 is configured to drive the sewing machine motor 33 in accordance with a control signal from the CPU 81. The needle bar up-down drive mechanism 55 is driven via a drive shaft 34 by the driving of the sewing machine motor 33 and moves the needle bar 6 up and down. A feed amount adjustment motor 17 is connected to the drive circuit 92. The drive circuit 92 is configured to drive the feed amount adjustment motor 17 in accordance with a control signal from the CPU 81. A feed amount of the sewing object by the feed mechanism 16 is adjusted by the driving of the feed amount adjustment motor 17. The drive circuit 93 is configured to display an image on the LCD 25 in accordance with a control signal from the CPU 81.

The processing device 3 will be described with reference to FIG. 2. The processing device 3 is a known device that can process the sheet-shaped workpiece W in accordance with processing data. The workpiece W is, for example, a sewing object such as a processing cloth or the like, a resin sheet, a printing medium such as paper, or the like. The processing device 3 of a present embodiment is provided with a head 5 to which a cutting blade 7 is detachably mounted, and can cut the workpiece W by relatively moving the head 5, in accordance with the processing data, in an X direction and a Y direction, which are two predetermined directions, with respect to the workpiece W. With the processing device 3 of the present embodiment, a drawing pen 8 can be detachably mounted in place of the cutting blade 7, and is configured to draw on the workpiece W by relatively moving the head 5, in accordance with the processing data, in the X direction and the Y direction with respect to the workpiece W. The workpiece W is held by being adhered to an inner side of a rectangular frame line 10 printed on the upper surface of a rectangular synthetic resin holding member 9. A substantially rectangular region on the inside of the frame line 10 is a processing region R in which the workpiece W can be processed using the processing device 3. The processing data includes coordinate data for relatively moving the head 5 with respect to the workpiece W. The coordinate data is set inside the processing region R and is represented by a processing coordinate system including X coordinates in the X direction and Y coordinates in the Y direction. The X direction is a lengthwise direction of the processing device 3. The Y direction is orthogonal to the X direction. The processing data executed by the processing device 3 in which the cutting blade 7 is attached to the head 5 is also referred to as cutting data. The processing data executed by the processing device 3 in which the drawing pen 8 is attached to the head 5 is also referred to as drawing data. In other words, the processing data of the present embodiment is data collectively referring to the cutting data and the drawing data.

The processing data generation processing performed by the sewing machine 1 will be described with reference to FIG. 3 to FIG. 6, using a specific example in which the processing data is generated for a T-shaped pattern 62 input by the user. The processing data is data for causing the processing device 3 to perform the processing with respect to the sheet-shaped workpiece W. The processing data of the present embodiment includes the cutting data for cutting the workpiece W using the cutting blade 7, and the drawing data for drawing on the workpiece W using the drawing pen 8. The processing data is used for cutting sewing object pieces when creating a patchwork representing a pattern specified by the user. The processing data generation processing is activated when the user operates the touch screen 26 and inputs a command to start the processing data generation processing. When the controller 2 detects the command to start the processing data generation processing, the controller 2 reads out, to the RAM 83, a program for executing the processing data generation processing stored in the program storage area of the ROM 82. The controller 2 performs the following steps in accordance with instructions included in the program read out to the RAM 83. Various parameters necessary for performing the processing data generation processing are stored in the flash memory 84. Various data obtained in the course of the processing data generation processing are stored as necessary in the RAM 83. Hereinafter, the left-right direction and up-down direction from FIG. 4 to FIG. 6 will be used in the description of various patterns and shapes.

Figure 3:
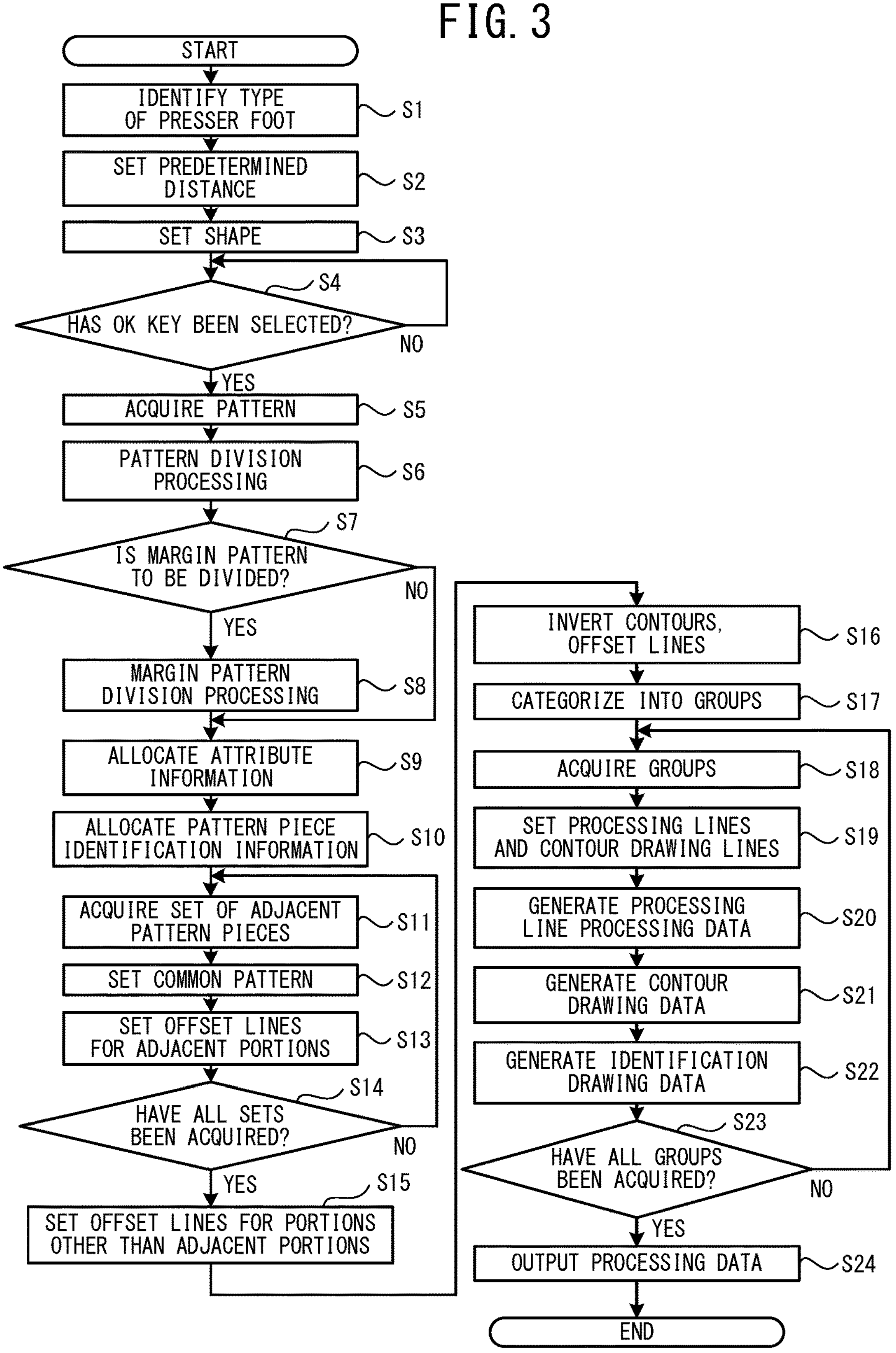
FIG. 3 is a flowchart of processing data generation processing.

As shown in FIG. 3, the controller 2 identifies a type of the presser foot 22 mounted to the lower end of the presser bar 21 (step S1). With the sewing machine 1 of the present embodiment, the single presser foot 22 selected from among a plurality of types of presser foot can be detachably mounted to the lower end of the presser bar 21. The controller 2 may identify the type of the presser foot 22 on the basis of information input by the user, or, when the sewing machine 1 is provided with a detector for detecting the type of the presser foot 22, the sewing machine 1 may identify the type of the presser foot 22 on the basis of a detection result of the detector. For example, the detector may be an imaging device that can capture an image of the lower end of the presser bar 21 and generate image data. In this case, the controller 2 may analyze the image data generated by the imaging device, and identify the type of the presser foot 22 mounted to the lower end of the presser bar 21. The detector may be a reader that reads an RFID tag attached to the presser foot 22 and representing the type of the presser foot 22. The controller 2 refers to the flash memory 84, and sets a predetermined distance D that corresponds to the type of the presser foot 22 identified at step S1 (step S2). The flash memory 84 stores the types of the presser foot 22 in correspondence with the predetermined distances D. The predetermined distance D indicates a seam allowance of the sewing object pieces configuring the patchwork. For example, the predetermined distance D is a distance, in the left-right direction, between a needle drop position P (refer to FIG. 9B) when the needle bar 6 is disposed at a left baseline position, which is a left end position of an oscillation range of the needle bar 6, and the right end of the presser foot 22.

Figures 4A, 4B, 4C, 4D:
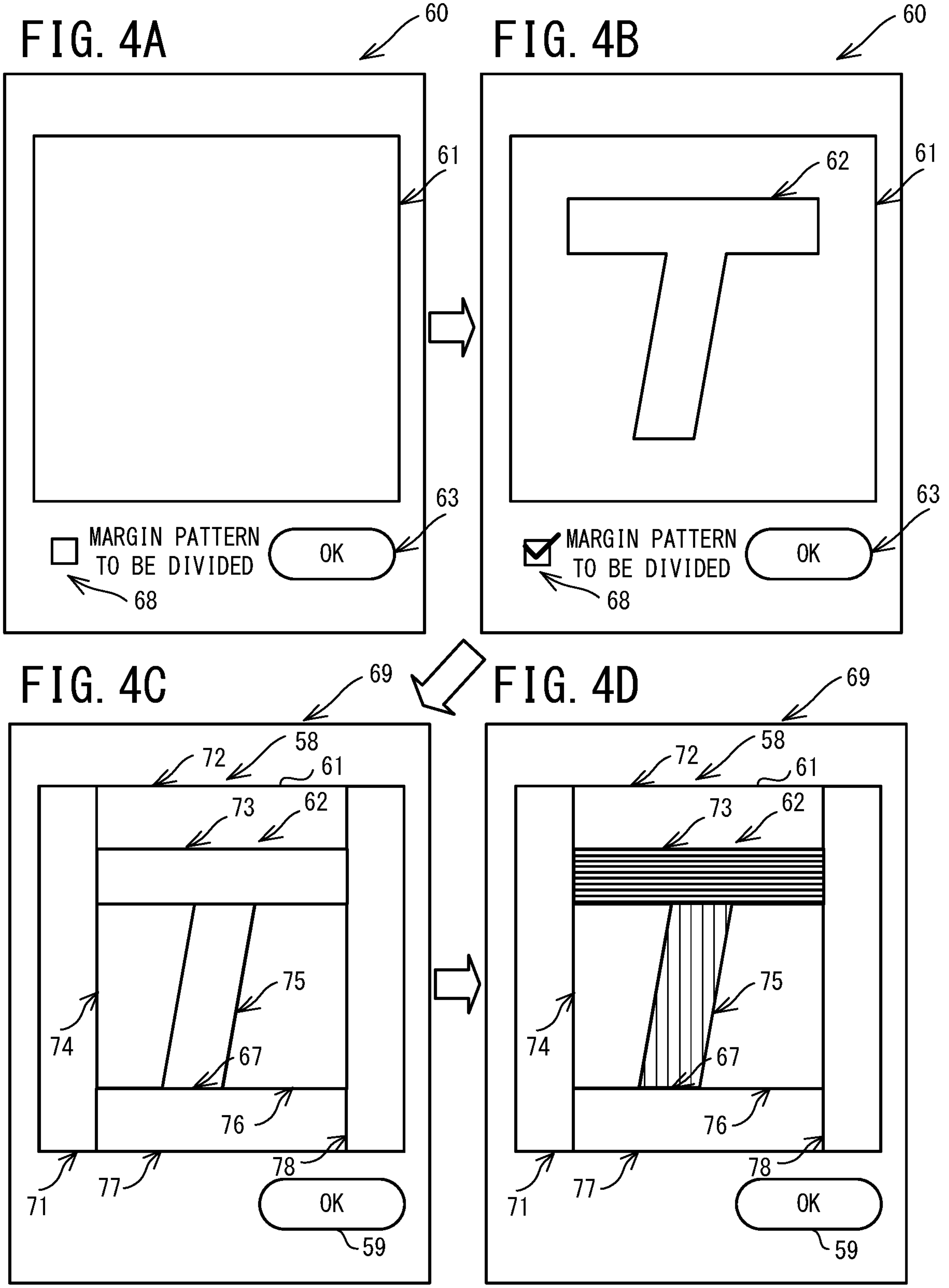
FIG. 4A to FIG. 4D are explanatory diagrams of changes in a screen displayed on an LCD when performing the processing data generation processing.

The controller 2 sets a shape (step S3). In main processing of the present embodiment, the pattern specified by the user is disposed inside the shape. The shape is represented as a loop using a single line. The graphic may be a geometrical shaped pattern, such as a circular shape, an elliptical shape, a polygonal shape, a star shape, a trapezoid, and the like. A configuration may be adopted in which the user can set the shape, size, and the like of the shape, or a configuration may be adopted in which the shape, size, and the like of the shape are set in advance. The controller 2 of the present embodiment sets a rectangular shape 61, and, as shown in FIG. 4A, displays a screen 60 on the LCD 25. The screen 60 includes the shape 61, an OK key 63, and a check box 68. The OK key 63 is selected when confirming the pattern that is the target of generating the processing data, and the arrangement of the pattern inside the shape 61. The check box 68 is used to input an instruction as to whether or not to divide a margin pattern. A margin pattern 67 is a pattern representing a portion between the pattern and the shape 61. As shown in FIG. 4B, in the specific example, the user operates the touch screen 26, arranges the pattern 62, which is the target of generating the processing data, inside the shape 61 displayed on the screen 60, and, after making a setting in the check box 68, selects the OK key 63. An arrangement method of the pattern 62 may be set as appropriate, and, for example, the shape of the pattern 62 may be specified by operating the touch screen 26, or the pattern 62 whose shape has been specified may be arranged. The pattern 62 may be selected from among the patterns stored in the flash memory 84, and may be arranged at a predetermined position with respect to the shape 61 (for example, a position at which the center of the shape 61 and a center of the pattern 62 are aligned). The pattern 62 may be acquired from the external device connected via the USB connector 28 and arranged inside the shape 61.

Figures 5A, 5B, 5C, 5D, 5E, 5F:
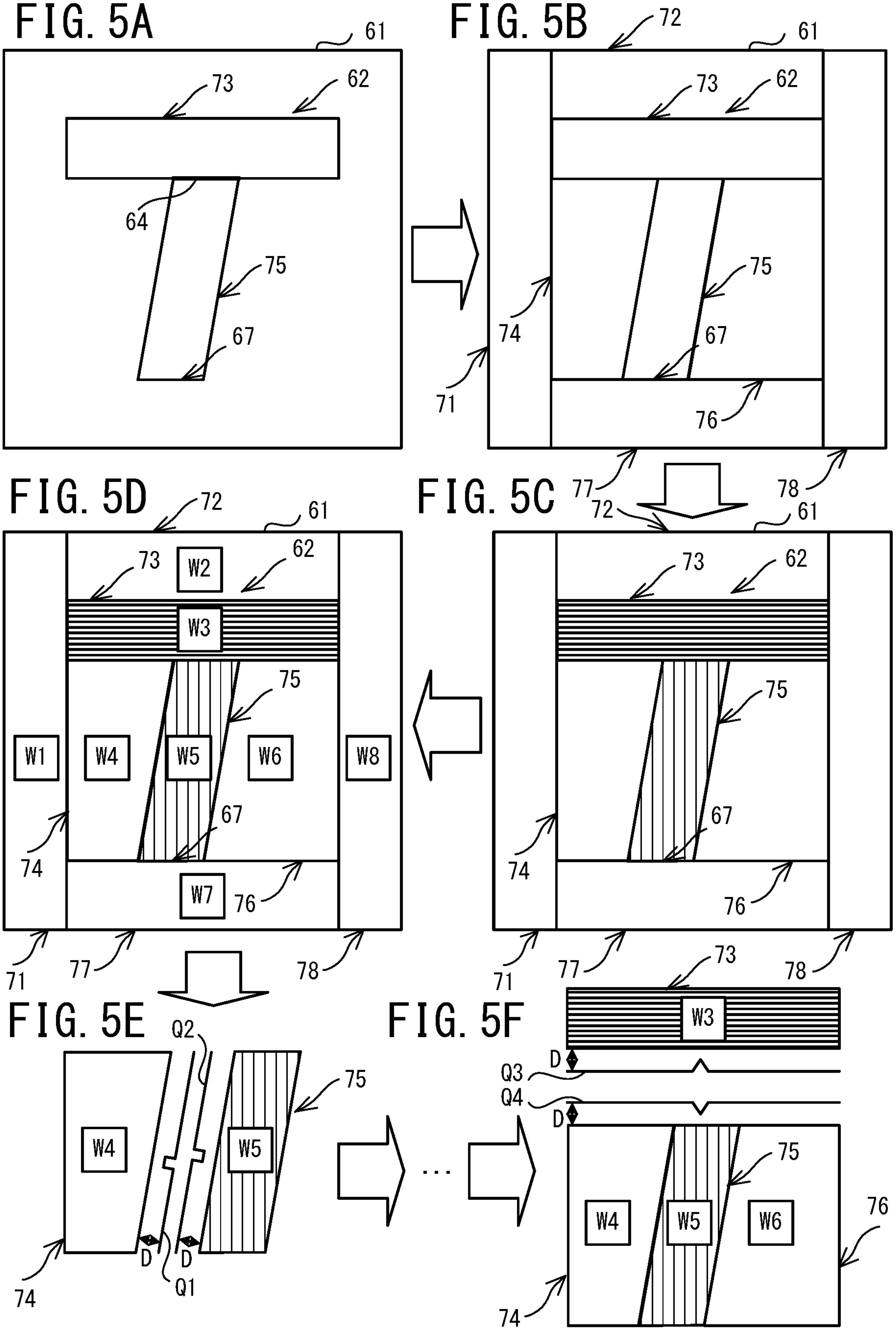
FIG. 5A to FIG. 5F are explanatory diagrams of a setting procedure for processing line processing data, contour drawing data, and identification drawing data.

The controller 2 determines whether the selection of the OK key 63 has been detected (step S4). The controller 2 stands by until the selection of the OK key 63 is detected (no at step S4). When the selection of the OK key 63 is detected (yes at step S4), the controller 2 acquires the pattern 62 disposed inside the graphic 61 (step S5). The pattern 62 is the T-shaped pattern represented by a contour. The controller 2 divides the pattern 62 acquired at step S5 into a plurality of pattern pieces (step S6). As the method for dividing the pattern acquired at step S5 into the plurality of pattern pieces, a known technique may be adopted as appropriate. As shown in FIG. 5A, the controller 2 of the present embodiment divides the pattern 62 into two square-shaped pattern pieces 73 and 75, by adding a partition line segment 64 that joins two points on the contour representing the pattern 62 acquired at step S5. The position of the partition line segment 64 may be set by the user, or may be set by the controller 2 in accordance with a number and the like of the pattern pieces that can be obtained as a result of the division. In addition to the square shape, the shape of each of the pattern pieces may be changed as appropriate, such as a triangular shape or the like.

The controller 2 determines, on the basis of the setting in the check box 68 when the selection of the OK key 63 is detected, whether to divide the margin pattern 67 (step S7). As shown in FIG. 4B, since a check mark is entered into the check box 68 in the present embodiment, the controller 2 determines to divide the margin pattern 67 (yes at step S7), and divides the margin pattern 67 into a plurality of pattern pieces (step S8). Processing at step S8 may be performed in a similar manner to the processing at step S6, or step S6 and step S8 may be performed using mutually different methods. As shown in FIG. 5B, for example, the controller 2 divides the margin pattern 67 into six pattern pieces 71, 72, 73, 74, and 76 to 78, and, as shown in FIG. 4C, displays on the LCD 25 a screen 69 representing the pattern pieces 71 to 78 divided by the processing at step S6 and step S8. The screen 69 includes a designation field 58, and a key 59. The designation field 58 is selected when inputting attribute information for each of the pattern pieces 71 to 78. The attribute information is information that is used to categorize the plurality of pattern pieces into a plurality of groups. The attribute information is, for example, information indicating a type (a color, a pattern, a material, and the like) of the sewing object representing the pattern piece. The attribute information of the present embodiment is the color of the sewing object piece configuring the patchwork. The key 59 is selected when inputting an instruction to allocate the attribute information displayed in the designation field 58. A method of allocating the attribute information may be set as appropriate, and the attribute information may be allocated by the user for each of the pattern pieces, or may be automatically allocated by the controller 2. In the present embodiment, for example, as shown in FIG. 4D, in the designation field 58, the attribute information is allocated to each of the pattern pieces 71 to 78. In the designation field 58, a first color is allocated to the six pattern pieces 71, 72, 74, and 76 to 78, a second color different from the first color is allocated to the pattern piece 73, and a third color different from the first color and the second color is allocated to the pattern piece 75. The user operates the touch screen 26 and, after verifying a setting state of the attribute information in the designation field 58, selects the key 59.

When the margin pattern 67 is not to be divided (no at step S7), or after the processing at step S8, when the selection of the key 59 is detected, as shown in FIG. 5C, the controller 2 allocates the attribute information to each of the pattern pieces 71 to 78, in accordance with a setting status of the attribute information in the designation field 58 (step S9). The controller 2 allocates identification information to each of the plurality of pattern pieces (step S10). A method of allocating the identification information may be set as appropriate, and as shown in FIG. 5D, for example, the controller 2 allocates identification information W1 to W8 to each of the pattern pieces 71 to 78. Apart from the character, the identification information allocated at step S10 may be a symbol, a shape, or the like. The controller 2 acquires, from among the plurality of pattern pieces 71 to 78, a set of adjacent pattern pieces that has not yet been acquired at step S11 (step S11). All of the pattern pieces 71 to 78 of the present embodiment are square shaped. For each of two of the adjacent pattern pieces, of the contour of one of the pattern pieces, the controller 2 identifies an adjacent portion adjacent to the other pattern piece, that is, identifies line segments on edges, of the two pattern pieces, which are mutually adjacent. When the adjacent portion of the one pattern piece is the same length as the adjacent portion of the other pattern piece, the controller 2 acquires the two adjacent pattern pieces as the set of adjacent pattern pieces. When the patchwork is to be created using the sewing object pieces corresponding to the pattern pieces, portions corresponding to the adjacent portions of the set of adjacent pattern pieces are portions at which a set of adjacent sewing object pieces are sewn together. For example, of the pattern pieces 71 to 78, the controller 2 acquires, as the set of adjacent pattern pieces, the pattern piece 74 and the pattern piece 75 that is to the right of the pattern piece 74 and is adjacent to the pattern piece 74.

The controller 2 refers to the pattern storage area 87, and sets a common pattern with respect to the set of adjacent pattern pieces acquired at step S11 (step S12). When the patchwork is to be created using the sewing object pieces corresponding to the pattern pieces, in order to make it easy to identify the set of sewing object pieces that are to be sewn together, from the plurality of sewing object pieces, the controller 2 generates the processing data for processing the adjacent portions of the common pattern or the seam allowance set for the adjacent portions. The controller 2 of the present embodiment can set, as the common pattern, at least one selected from the group of a cutting pattern and a drawing pattern. As shown in the pattern storage area 87 shown in FIG. 2, the cutting pattern is represented by a notch shape formed in the seam allowance set for the adjacent portion. The drawing pattern is represented by a line type of a line that draws the adjacent portion. The drawing pattern may be represented by a color of the line that draws the adjacent portion, a number of the lines that draw the adjacent portions, and the like. The controller 2 of the present embodiment sets the cutting pattern of the rectangular shaped notch as the common pattern for the pattern pieces 74 and 75, for example (step S12).

The controller 2 sets offset lines for the adjacent portions of the set of adjacent pattern pieces acquired at step S11 (step S13). The offset line is a line disposed at a position separated by the predetermined distance D from the adjacent portion of the set of adjacent pattern pieces, on the outside, with respect to the contour of a first piece. The first piece is one of set of adjacent pattern pieces. The adjacent portion is adjacent to a second piece. The second piece is another of set of adjacent pattern pieces. The outside is opposite to a side of a region surrounded by the contour of the first piece. A region between the offset line and the adjacent portion indicates the seam allowance of the sewing object piece corresponding to the pattern piece. The predetermined distance D is the distance set at step S2. As shown in FIG. 5E, the controller 2 of the present embodiment, uses the cutting pattern of the rectangular notch set at step S12, sets an offset line Q1 disposed at a position separated to the right by the predetermined distance D from the right edge of the pattern piece 74, and sets an offset line Q2 disposed at a position separated to the left by the predetermined distance D from the left edge of the pattern piece 75. The cutting pattern of the rectangular notch shape set at step S12 is, for example, disposed in the vicinity of the center of the offset line, taking into account the arrangement of the offset lines with respect to the adjacent portions. The positions of the notches with respect to the offset lines are adjusted such that, when the offset line Q2 and the contour of the pattern piece 75 are inverted with respect to an extending direction of the offset line Q2, while maintaining the arrangement between the offset line Q2 and the contour of the pattern piece 75, the notches of the offset line Q1 and the offset line Q2 are perfectly overlapped, and the adjacent portion of the pattern piece 74 and the adjacent portion of the pattern piece 75 overlap perfectly with each other. In this way, the controller 2 sets the offset line Q1 corresponding to the pattern piece 74 by processing the pattern piece 74 as the first piece and the pattern piece 75 as the second piece. The controller 2 sets the offset line Q2 corresponding to the pattern piece 75 by processing the pattern piece 75 as the first piece and the pattern piece 74 as the second piece.

Of the plurality of pattern pieces 71 to 78, the controller 2 determines whether all the sets of adjacent pattern pieces have been acquired at step S11 (S14). When the sets of adjacent pattern pieces acquired at step S11 are not all of the sets of adjacent pattern pieces (no at step S14), the controller 2 returns the processing to step S11. At step S11, when the adjacent portion of the one pattern piece and the adjacent portion of the other pattern piece are not the same length as each other, for each of the two adjacent pattern pieces, the controller 2 identifies all of the pattern pieces adjacent to the edge that includes the adjacent portion of the pattern piece for which the adjacent portion is longer, and acquires the pattern piece having the longer adjacent portion and all of the pattern pieces adjacent to the edge including that adjacent portion, as the set of adjacent pattern pieces. For example, for the pattern piece 73, the lower edge of the pattern piece 73 is in contact with the upper edge of the pattern piece 74, but the lower edge of the pattern piece 73 is longer than the upper edge of the pattern piece 74. In this case, the controller 2 identifies the pattern pieces 74 to 76 as the pattern pieces that are adjacent to the pattern piece 73 at the lower edge of the pattern piece 73, and acquires the pattern pieces 73 to 76 as the set of adjacent pattern pieces. The controller 2 sets, as the common pattern for the set of adjacent pattern pieces 73 to 76, the cutting pattern having the triangular notch (step S12). As shown in FIG. 5F, the controller 2 sets an offset line Q3 disposed at a position separated by the predetermined distance D downward from the lower edge of the pattern piece 73, and an offset line Q4 disposed at a position separated by the predetermined distance D upward from the upper edges of the pattern pieces 74 to 76 (step S13). The controller 2 may dispose the triangular notches set at step S12 at each of positions separated upward from the upper edges of the pattern pieces 74 to 76 by the predetermined distance D, or may dispose three of the triangular notches corresponding to the number of the pattern pieces 74 to 76 at positions separated by the predetermined distance D downward from the lower edge of the pattern piece 73.

Figure 6G:
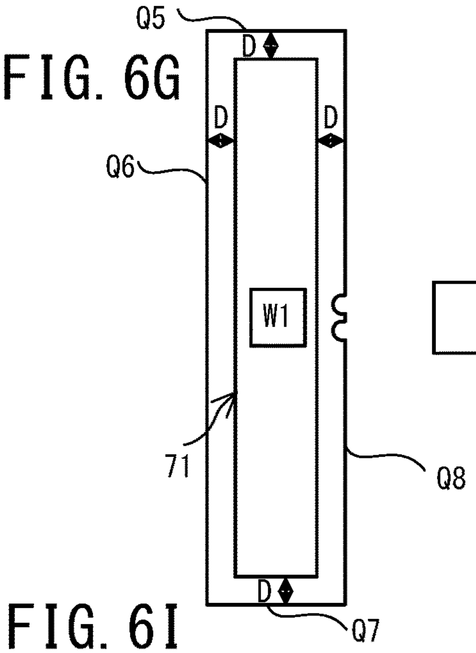
FIG. 6G to 6I are explanatory diagrams of the setting procedure for the processing line processing data, the contour drawing data, and the identification drawing data.

Of the plurality of pattern pieces 71 to 78, when all of the sets of adjacent pattern pieces have been acquired at step S11 (yes at step S14), the controller 2 sets offset lines, for the contours of each of the plurality of pattern pieces 71 to 78, disposed at positions separated by the predetermined distance D to the outside of portions that do not include the adjacent portion (step S15). At step S15, the controller 2 sets straight line offset lines. As shown in FIG. 6G, for the pattern piece 71 of a specific example, the controller 2 sets an offset line Q5 disposed at a position separated upward by the predetermined distance D from the upper edge of the pattern piece 71, sets an offset line Q6 disposed at a position separated to the left by the predetermined distance D from the left edge of the pattern piece 71, and sets an offset line Q7 disposed at a position separated downward by the predetermined distance D from the lower edge of the pattern piece 71. The offset lines Q5 to Q8 of the pattern piece 71 are set in an annular manner as a whole, and surround the contour of the pattern piece 71. In a similar manner, the controller 2 sets offset lines for the upper edge of the pattern piece 72, for the lower edge of the pattern piece 77, and for each of the upper edge, the right edge, and the lower edge of the pattern piece 78. By the processing at step S15, the offset lines are set that are disposed at positions separated by the predetermined distance D to the outside of the contours of the pattern pieces, for all of the contours of the pattern pieces for each of the pattern pieces 71 to 78, and the contours of the pattern pieces are surrounded by the set offset lines.

Figure 6H:
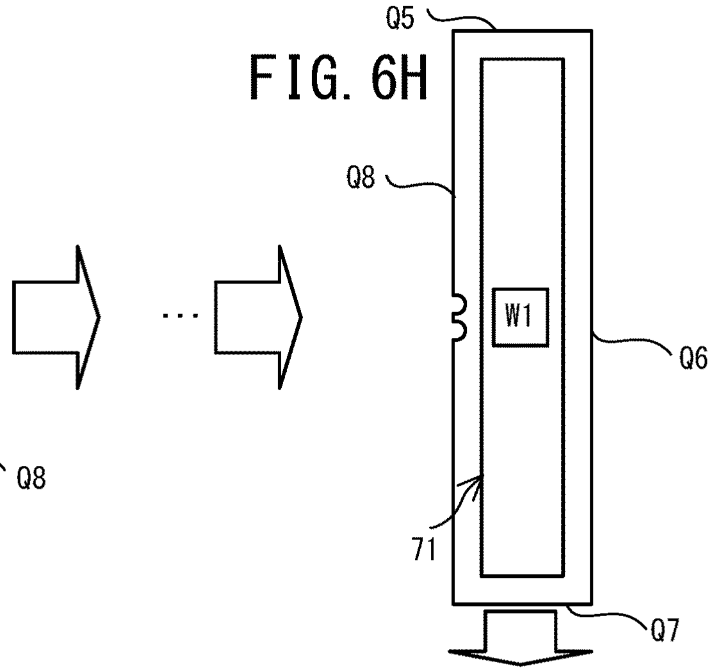

For each of the plurality of pattern pieces 71 to 78, the controller 2 performs a left-right inversion of the contour of the pattern piece 71 with the offset lines set by the processing at step S13 and step S15 (step S16). The processing data generated by the controller 2 of the present embodiment includes contour drawing data that draws, on the reverse surface of the sewing object piece, the contour of the sewing object piece configuring the patchwork. Thus, the controller 2 performs processing at step S16. For example, as shown in FIG. 6H, the controller 2 left-right inverts the pattern piece 71. The controller 2 may set the offset lines for each of the inverted pattern pieces after left-right inverting each of the plurality of pattern pieces.

The controller 2 categorizes the pattern pieces 71 to 78 into a plurality of groups (step S17). A method for categorizing the pattern pieces 71 to 78 into the plurality of groups may be set as appropriate. On the basis of the attribute information allocated to each of the pattern pieces 71 to 78 by the processing at step S9, the controller 2 of the present embodiment categorizes the pattern pieces 71 to 78 into three groups, namely, a first group including the six pattern pieces 71, 72, 74, and 76 to 78, a second group including the pattern piece 73, and a third group including the pattern piece 75. Of the plurality of groups categorized at step S17, the controller 2 acquires one of the groups that has not been acquired by the processing at step S18 (step S18), and, for the one or more pattern pieces included in the group acquired at step S18, sets processing lines and contour drawing lines inside the processing region R of the processing device 3 (step S19).

Figure 6I:
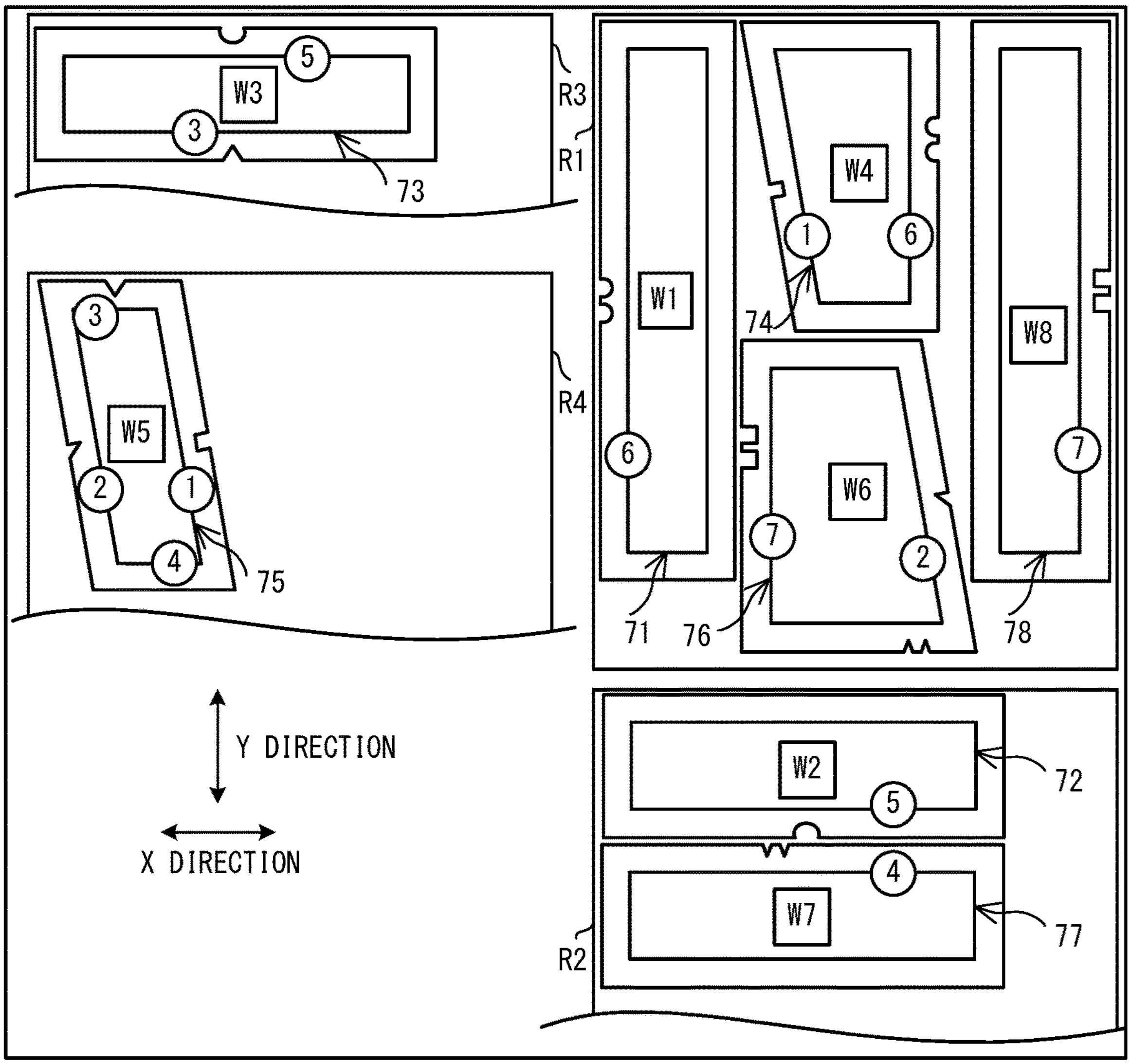

The processing line is a line indicating a position at which the workpiece W is processed, using the processing device 3, along the offset line that has been set at step S13 and step S15 and has been left-right inverted at step S16. As the processing line, the controller 2 of the present embodiment sets the line indicating a position at which the sewing object is cut, using the processing device 3, along the offset line that has been set at step S13 and step S15 and has been left-right inverted at step S16. The contour drawing line is a line indicating a position of the contour of the pattern piece that has been left-right inverted at step S16 that is drawn on the reverse surface of the sewing object using the processing device 3. The size of the processing region R of the processing device 3 may be stored in advance in the flash memory 84, for example, or a configuration may be adopted in which the size of the processing region R can be set by the user. The controller 2 sets the processing lines and the contour drawing lines inside the processing region R such that regions surrounded by the processing lines do not overlap. When the controller 2 cannot dispose all of the one or more pattern pieces included in the same group inside the same processing region R, the controller 2 sets a plurality of the processing regions R, and only disposes the pattern pieces included in the same group inside the same processing region R. In the processing at step S18 relating to the first group, as shown in FIG. 6I, the controller 2 sets the plurality of processing regions R1 and R2 for the pattern pieces 71, 72, 74, and 76 to 78 included in the first group, and disposes the pattern pieces 71, 72, 74, and 76 to 78 such that regions surrounded by the offset lines do not overlap with each other. The left-right direction and the up-down direction in FIG. 6I correspond to the X direction and the Y direction of the processing coordinate system, respectively. The controller 2 sets the orientations of the pattern pieces in the X direction and the Y direction to be the same with respect to the workpiece W in the same processing region R.

The controller 2 generates processing line processing data for processing the workpiece W along the processing lines set at step S19 using the processing device 3 (step S20). The controller 2 of the present embodiment generates the processing line processing data for cutting the sewing object along the processing lines set at step S19 using the processing device 3 to which the cutting blade 7 is mounted. The controller 2 generates contour drawing data for drawing the contours of the pattern pieces on the sewing object along the contour drawing lines set at step S19, using the processing device 3 to which the drawing pen 8 is mounted (step S21). The controller 2 of the present embodiment includes data that draws the pattern piece identification information allocated at step S10 in the contour drawing data. Of the pattern pieces 71 to 78, for each of the two adjacent pattern pieces, the controller 2 generates identification drawing data that draws common identification information that is common to a pair of the adjacent portions and that identifies the adjacent portion adjacent to the other pattern piece (step S22). As the common identification information, the controller 2 of the present embodiment sets a number indicating a sewing order of the sewing object pieces, when sewing together the eight sewing object pieces and creating the patchwork representing the pattern 62 as a whole. As shown in FIG. 6I, the controller 2 generates, as the identification drawing data, data for drawing, on the edges that are the adjacent portions of the set of adjacent pattern pieces, the identification information surrounded by circular shapes.

The controller 2 determines whether or not all of the groups set by the processing at step S17 have been acquired by the processing at step S18 (step S23). When there is a group that has not been acquired at step S18 (no at step S23), the controller 2 returns the processing to step S18. As shown in FIG. 6I, for the second group (step S18), the controller 2 sets the processing lines and the contour drawing lines for the pattern piece 73 in a processing region R3 different from the processing regions R1 and R2 (step S19), and generates each of the processing line processing data, the contour drawing data, and the identification drawing data (step S20 to step S22). For the third group (step S18), the controller 2 sets the processing lines and the contour drawing lines for the pattern piece 75 in a processing region R4 different from the processing regions R1 to R3 (step S19), and generates each of the processing line processing data, the contour drawing data, and the identification drawing data (step S20 to step S22). When all of the groups have been acquired by the processing at step S18 (yes at step S23), the controller 2 outputs the processing data generated at step S20 to step S22 per group (step S24). For example, the controller 2 stores the processing data in the USB device 30 connected to the USB connector 28 and in the flash memory 84. When the sewing machine 1 is connected to the processing device 3 by a wireless or a wired connection, the sewing machine 1 may output the processing data to the processing device 3. The sewing machine 1 of the present embodiment refers to the processing data stored in the flash memory 84, in sewing guide processing to be described below. The sewing machine 1 here ends the processing data generation processing.

On the basis of the output data, the user causes the processing device 3 to be driven in accordance with the processing data. The processing device 3 processes the workpiece W with the sewing object as the workpiece W. For example, the user causes the sewing object of the first color to be held by the holding member 9 such that the reverse surface of the sewing object is the upper surface, and causes the processing device 3 to be driven on the basis of the processing line processing data, the contour drawing data, and the identification drawing data for performing the processing inside the processing region R1. When the patchwork is created by cutting out the sewing object pieces from the sewing object and sewing them together, of the surfaces of the sewing object, the reverse surface of the sewing object is the surface of the side on which the seam allowance is disposed. The processing device 3 processes the sewing object in accordance with each of the data. An order of executing the processing line processing data, the contour drawing data, and the identification drawing data may be set as appropriate. For example, after the processing device 3 performs the drawing processing that draws on the reverse surface of the sewing object on the basis of the contour drawing data and the identification drawing data, in a state in which the drawing pen 8 is mounted, the processing device 3 may perform the cutting processing that cuts the sewing object along the processing lines on the basis of the processing line processing data, in a state in which the drawing pen 8 is replaced with the cutting blade 7. Similarly, the user can obtain the eight sewing object pieces corresponding to each of the pattern pieces 71 to 78 by causing each of the processing processes to be executed for the processing region R2, or by causing each of the processing processes to be executed for the processing region R3 using the sewing object of the second color, and the processing region R4 using the sewing object of the third color.

The sewing guide processing will be described with reference to FIG. 7 to FIG. 9, using a specific example of creating the patchwork representing the T-shaped pattern 62 as a whole, by sequentially sewing together the eight sewing object pieces created on the basis of the data output by the processing data generation processing. The sewing guide processing is activated when the user operates the touch screen 26 and inputs a command to start the sewing guide processing. When the controller 2 detects the command to start the sewing guide processing, the controller 2 reads out, to the RAM 83, a program for performing the sewing guide processing stored in the program storage area of the ROM 82. The controller 2 performs the following steps in accordance with instructions included in the program read out to the RAM 83. Various parameters necessary for performing the sewing guide generation processing are stored in the flash memory 84. Various data obtained in the course of the sewing guide processing are stored as necessary in the RAM 83.

Figure 7:
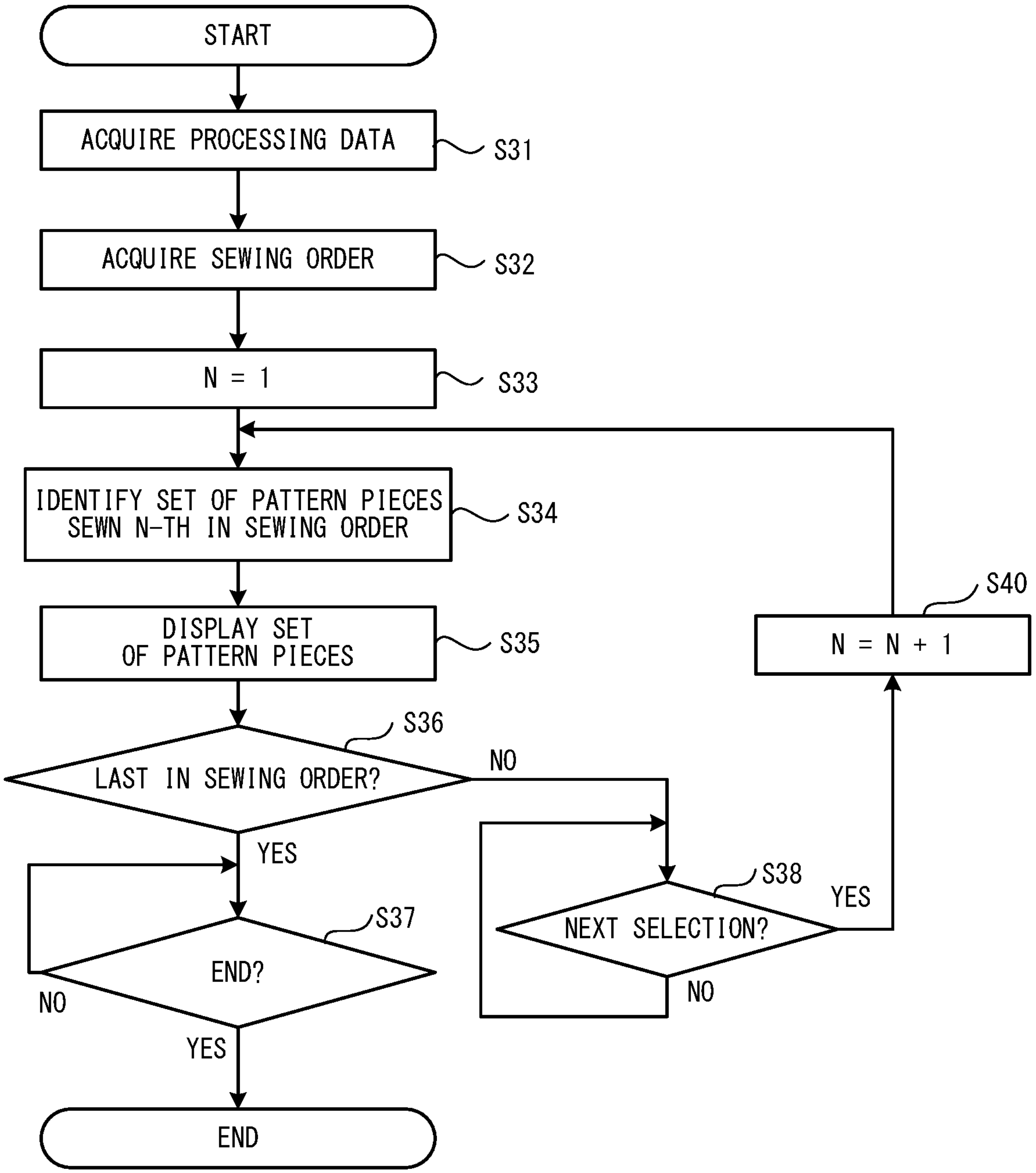
FIG. 7 is a flowchart of sewing guide processing.
Figure 8:
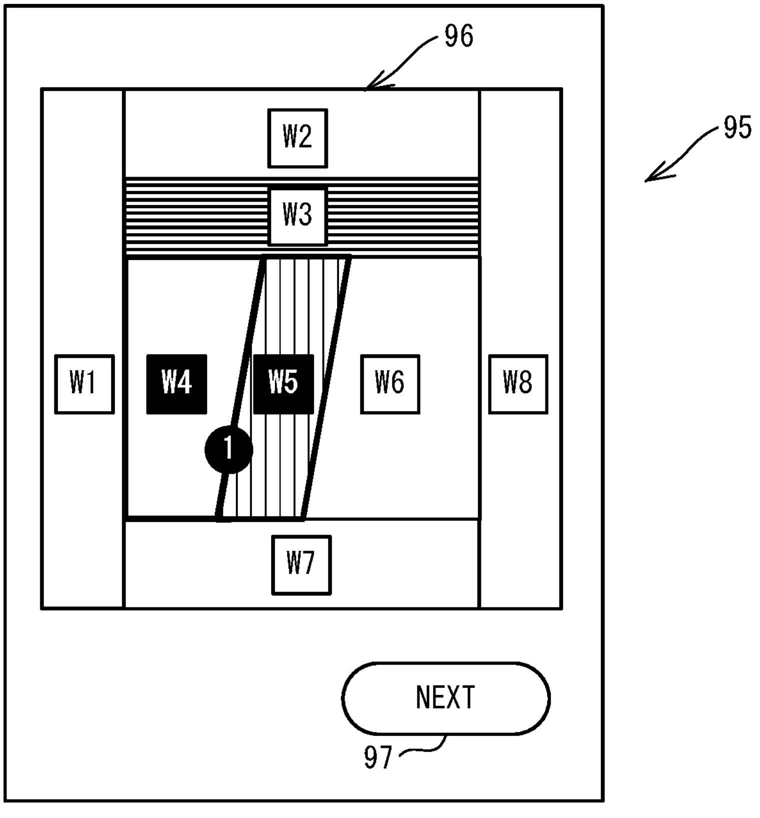
FIG. 8 is an explanatory diagram of a screen displayed on the LCD when performing the sewing guide processing.

As shown in FIG. 7, the controller 2 acquires, from the flash memory 84, the processing data output by the processing at step S24 of the processing data generation processing (step S31). The controller 2 acquires a sewing order on the basis of the identification drawing data included in the data acquired at step S31 (step S32). The controller 2 may acquire the sewing order specified by the user, may automatically set the sewing order using a known method on the basis of the processing data acquired at step S31, and may acquire the set sewing order. The controller 2 sets a variable N, which indicates the sewing order, to 1 (step S33). On the basis of the identification drawing data, the controller 2 identifies the set of sewing object pieces corresponding to the set of pattern pieces to be sewn N-th in the sewing order (step S34). The controller 2 displays the set of pattern pieces identified at step S34 on the LCD 25, while distinguishing between the plurality of pattern pieces (step S35). When the variable N is 1, the controller 2 displays a screen 95 shown in FIG. 8 on the LCD 25. The screen 95 includes a display field 96 and a key 97. The display field 96 displays the set of pattern pieces 74 and 75 identified at step S34 in a manner of being distinguished from the other pattern pieces. In the display field 96, by displaying the identification information of the set of pattern pieces 74 and 74 and the identification information common to the adjacent portions disposed at the adjacent portions using white lettering on a black background, and by displaying the contour of the set of pattern pieces 74 and 75 using a thicker line than the contours of the other pattern pieces, the set of pattern pieces 74 and 75 are displayed in the manner of being distinguished from the other pattern pieces. The key 97 is selected when inputting a command to display the next set of pattern pieces in the sewing order.

Figure 9A:
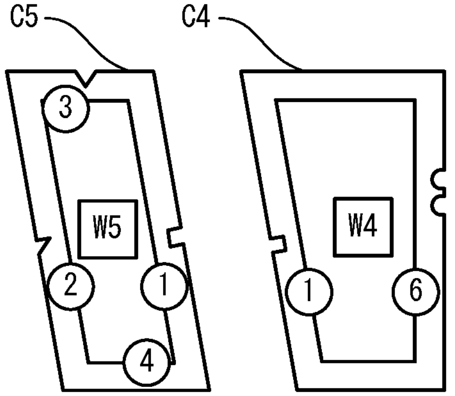
FIG. 9A is an explanatory diagram of sewing pieces and FIG. 9B is an explanatory diagram of an arrangement of the sewing pieces with respect to a presser foot when sewing together the sewing pieces.
Figure 9B:
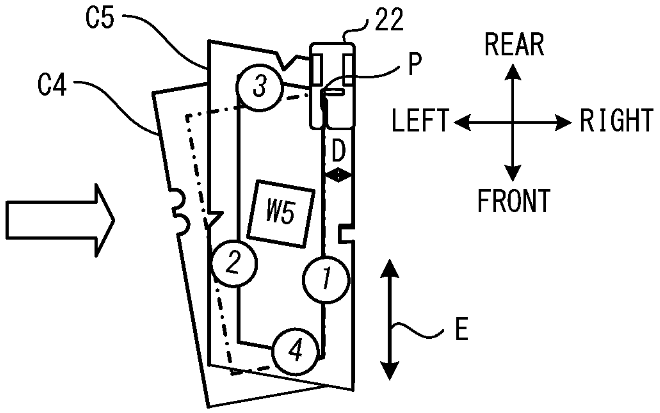

As shown in FIG. 9A, the user refers to the screen 95 displayed on the LCD 25, identifies a set of sewing object pieces C4 and C5 corresponding to the set of pattern pieces 74 and 75 that are first in the sewing order, causes the two identified sewing object pieces C4 and C5 to be placed face-to-face, and overlaps the ends, of the sewing object pieces C4 and C5, so as to correspond with the offset lines. In an extending direction E of the ends of the sewing object pieces, the user determines the relative positions of the two sewing object pieces C4 and C5 using the notch positions provided at the ends of the two sewing object pieces C4 and C5 as markers. In a state in which the positions of the sewing object piece C4 and C5 are determined in the extending direction E, the adjacent portion of the sewing object piece C4 and the adjacent portion of the sewing object piece C5 overlap each other in the up-down direction. As shown in FIG. 9B, in a state in which the needle bar 6 is disposed at the left baseline position and the ends of the two sewing object pieces C4 and C5 are aligned with the right end of the presser foot 22, the user operates the start/stop switch 29 and drives the sewing machine 1, and sews together the two sewing object pieces C4 and C5. The user may sew together the two sewing object pieces C4 and C5 along the contour drawing line drawn on the sewing object piece C5 or C4 that overlaid on the upper side.

The controller 2 determines whether the variable N indicates the last of the sewing order (step S36). When the variable N does not indicate the last of the sewing order (no at step S36), the controller 2 determines whether or not the selection of the key 97 has been detected (step S38). The controller 2 continues the processing at step S38 until the selection of the key 97 is detected (no at step S38). When the selection of the key 97 is detected (yes at step S38), the controller 2 increments the variable N by adding 1 (step S40), and returns the processing to step S34. When the variable N indicates the last in the sewing order (yes at step S36), the controller 2 determines whether selection of an END key for inputting a command to end the sewing guide processing, which is included in the screen displayed on the LCD 25 at step S35, has been detected (step S37). The controller 2 continues the processing at step S37 until the selection of the END key is detected (no at step S37). When the selection of the END key is detected (yes at step S37), the controller 2 ends the sewing guide processing.

The sewing machine 1 of the above-described embodiment is provided with the presser bar 21, the controller 2, and the ROM 82. The presser foot 22 can be detachably mounted to the lower end portion of the presser bar 21, and presses the sewing object from above. The ROM 82 stores the programs executed by the controller 2. In accordance with the programs stored in the ROM 82, the controller 2 acquires the pattern 62 represented by the contours (step S5), divides the acquired pattern 62 into the plurality of pattern pieces 73 and 75 (step S6), and sets the predetermined distance D that corresponds to the type of the presser foot 22 mounted to the lower end portion of the presser bar 21 (step S2). As shown in FIG. 5E, of the pattern pieces 73 and 75 representing the pattern 62 as a whole, for each of the adjacent two pattern pieces 73 and 75, the controller 2 sets the offset lines Q3 and Q4 disposed at positions separated by the predetermined distance D to the outside from the adjacent portion, of the contour of the pattern piece. The adjacent portion is adjacent to the adjacent portion of the other pattern piece, the outside being on the opposite side, with respect to the contour of the one of the two pattern pieces 73 and 75, from the side of the region surrounded by the contour of the first piece (step S13). For each of the pattern pieces 73 and 75, the controller 2 sets the processing lines that include the offset lines and surround the pattern pieces (step S19). For each of the pattern pieces 73 and 75, the controller 2 generates the processing line processing data that processes the workpiece W along the processing lines, using the processing device 3 (step S20).

The sewing machine 1 is configured to generate the processing line processing data that causes the processing device 3 to process the workpiece W along the processing lines. The processing device 3 can process the workpiece W along the processing lines, on the basis of the generated processing data. For example, the user can create the patchwork on the basis of the workpiece W using the following procedure. On the basis of the workpiece W that has been processed along the processing lines, the user acquires the plurality of sewing object pieces cut in the shapes of the processing lines. The user causes the two sewing object pieces corresponding to the adjacent two pattern pieces to be placed face-to-face, and overlaps the ends of the sewing object pieces to correspond with the offset lines. By sewing at a position of the predetermined distance D from the ends of the sewing object pieces corresponding with the offset lines, the user can sew together the two sewing object pieces at a position corresponding to the adjacent portions of the two adjacent pattern pieces. The user sequentially sews the plurality of sewing object pieces corresponding to each of the plurality of pattern pieces. As shown in FIG. 9B, when creating the patchwork using the processing data generated by the sewing machine 1 and output at step S24, the user does not need to verify the position at which the sewing object pieces are sewn together. Thus, compared to known art, the sewing machine 1 contributes to improving user convenience when creating the patchwork, and, in particular, contributes to improving efficiency of an operation to determine the position at which the two sewing object pieces corresponding to the two pattern pieces are sewn together.

For each of the pattern pieces 73 and 75, the controller 2 of the sewing machine 1 sets, for the whole contour of the pattern pieces 73 and 75, the offset lines disposed at the position separated by the predetermined distance D to the outside of the contour of the pattern piece (step S13 and step S15), and sets the offset lines surrounding the pattern pieces as the processing lines (step S19). The sewing machine 1 contributes to generating the processing line processing data in which, of the pattern pieces 73 and 75 representing the pattern 62 as a whole, the processing lines are disposed at the positions separated by the predetermined distance D to the outside of the contours of the pattern pieces, for the portions that are not the adjacent portions also.

The processing device 3 can cut the workpiece W using the cutting blade 7. For each of the pattern pieces 73 and 75 representing the pattern 62 as a whole, the controller 2 of the sewing machine 1 generates, as the processing line processing data, the cutting data that cuts the workpiece W along the processing lines, using the processing device 3 (step S20). Thus, the sewing machine 1 can generate the cutting data that cuts the workpiece W along the processing lines using the processing device 3. For example, when the workpiece W is the sewing object, the processing device 3 can cut the sewing object along the processing lines in accordance with the processing line processing data. The sewing machine 1 contributes to reducing time and effort for the user to manually cut the sewing object in order to obtain the plurality of sewing object pieces for creating the patchwork.

The processing device 3 can draw on the workpiece W using the drawing pen 8. For each of the pattern pieces 73 and 75, the controller 2 of the sewing machine 1 generates the contour drawing data that draws the contours of the pattern pieces 73 and 75 on the workpiece W, in accordance with the program stored in the ROM 82 (step S21). The sewing machine 1 is configured to generate the contour drawing data that draws formation positions of stitches. For example, when the sewing object is the workpiece W, the processing device 3 can draw the contours of the pattern pieces on the sewing object on the basis of the contour drawing data. The sewing machine 1 contributes to enabling the user to confirm, on the basis of the drawn contours of the pattern pieces, the position at which the two sewing object pieces corresponding to the two adjacent pattern pieces are sewn together.

The controller 2 of the sewing machine 1 categorizes the plurality of pattern pieces generated at step S6 into the plurality of groups, in accordance with the program stored in the ROM 82 (S17). For each of the plurality of pattern pieces 73 and 75, the controller 2 generates the processing line processing data that processes the workpiece W along the processing lines per group, using the processing device 3 (step S20). The sewing machine 1 can generate the processing line processing data for each of the categorized groups. The processing device 3 can process the workpiece W along the processing lines, per group, in accordance with the processing line processing data. For example, when the plurality of type of sewing object are cut into the sewing object pieces, and the patchwork is created that represents the pattern as a whole, compared to a case in which the processing data is not generated per group, by categorizing the pattern pieces represented by the same type of the sewing object pieces into the same group, the user can reduce time and effort when preparing the sewing object pieces. Thus, the sewing machine 1 contributes to improving user convenience when the plurality of types of sewing object are cut into the sewing object pieces, and the patchwork representing the pattern as a whole is created.

The controller 2 of the sewing machine 1 generates the contour drawing data that draws the contours of the pattern pieces on the workpiece W per group, for each of the plurality of pattern pieces, in accordance with the program stored in the ROM 82 (step S21). Thus, the sewing machine 1 is configured to generate, per group, the contour drawing data that draws the formation positions of the stitches. For example, when the sewing object is the workpiece W, the processing device 3 can draw the contours of the pattern pieces on the sewing object pieces on the basis of the contour drawing data. On the basis of the drawn contours of the pattern pieces, the user can verify the position at which the two sewing object pieces corresponding to the two adjacent pattern pieces are sewn together. For example, when cutting the plurality of types of sewing object into the sewing object pieces and creating the patchwork that represents the pattern as a whole, the user can categorize the pattern pieces represented by the same type of the sewing object pieces into the same group. Compared to a case in which the processing data is not generated per group, the sewing machine 1 contributes to simplifying the processing by the processing device 3 that draws the contours of the pattern pieces on the sewing object.

For at least some of the pattern pieces 73 and 75 representing the pattern 62 as a whole, the controller 2 of the sewing machine 1 generates the processing line processing data that processes the workpiece W along the processing lines set with respect to the pattern pieces that have been inverted with respect to a reference (step S16, step S20). For at least some of the pattern pieces 73 and 75, the controller 2 generates the contour drawing data that draws, on the workpiece W, the contours of the pattern pieces that have been inverted with respect to the reference (step S16, step S21). For example, when the sewing object is the workpiece W, the processing device 3 can draw the contours of the pattern pieces on the reverse surface of the sewing object, on the basis of the contour drawing data. On the basis of the drawn contours of the pattern pieces, the user can verify the position at which the two sewing object pieces corresponding to the two adjacent pattern pieces are sewn together. Since the contours of the pattern pieces are drawn on the reverse surface of the sewing object, the sewing machine 1 contributes to allowing the user to easily verify the drawn position, even when sewing together the two sewing object pieces in a state of being placed face-to-face.

For each of the two adjacent pattern pieces, the controller 2 of the sewing machine 1 generates the identification drawing data that draws the identification information that is common to the pair of adjacent portions, of the pattern pieces 73 and 75, and that identifies the adjacent portion adjacent to the other pattern piece (step S22). Thus, the processing device 3 can draw the common identification information on the workpiece W, on the basis of the identification drawing data. On the basis of the drawn common identification information, the user easily identifies the pair of adjacent portions that are to be sewn together, of the plurality of sewing object pieces representing the pattern as a whole. The common identification information of the above-described embodiment represents the sewing order of the two adjacent pattern pieces, and thus, the sewing machine 1 contributes to the user referring to the identification information and sewing the pattern pieces together in an appropriate order.

For each of the two adjacent pattern pieces 73 and 75, the controller 2 of the sewing machine 1 sets the offset lines that use the pattern common to the pair of adjacent portions, of the contours of the pattern pieces, at the positions disposed in the positions separated by the predetermined distance D to the outside from the adjacent portions (step S12 and step S13). Thus, for each of the two adjacent pattern pieces, the sewing machine 1 can set the offset lines that use the common pattern at the positions disposed at the positions separated by the predetermined distance D to the outside from the adjacent portions. On the basis of the processing data, the processing device 3 can process the workpiece W along the offset lines that use the common pattern. On the basis of the workpiece W processed in accordance with the processing data, the user can obtain the sewing object pieces cut along the offset lines that use the common pattern. The user can easily identify the position at which the two sewing object pieces corresponding to the two adjacent pattern pieces are to be sewn together, using the common pattern as a guide. The common pattern of the present embodiment is the shape of the notch formed in the seam allowance of the sewing object piece. As shown in FIG. 9B, the positions of the notches are set to be mutually aligned in the state in which the two sewing object pieces C4 and C5 corresponding to the two adjacent pattern pieces 74 and 75 are overlaid with each other while being placed face-to-face, and the portions corresponding to the adjacent portions of the pattern pieces 74 and 75 overlap with each other in the up-down direction. Thus, when the two sewing object pieces C4 and C5 have mutually different shapes and are overlaid with each other while being placed face-to-face, even when the two sewing object pieces do not perfectly overlap, the user easily identifies the relative positions of the ends of the sewing object pieces in the extending direction E, using the positions of the notches as a guide. In other words, compared to the known art, the sewing machine 1 contributes to improving user convenience when creating the patchwork, and, in particular, contributes to improving the efficiency of the operation to determine the position at which the two sewing object pieces corresponding to the two pattern pieces are sewn together.

The controller 2 sets the shape 61 that encompasses the pattern 62, in accordance with the program stored in the ROM 82 (step S3), and divides margin pattern 67 representing the portion between the pattern and the shape into the plurality of pattern pieces 71, 72, 74, and 76 to 78 (step S8). The controller 2 sets the offset lines for the plurality of pattern pieces 73 and 75 representing the pattern 62 as a whole and for each of the plurality of pattern pieces 71, 72, 74, and 76 to 78 representing the margin pattern 67 as a whole (step S13), and generates the processing line processing data (step S20). In addition to the processing line processing data for the pattern pieces 73 and 75 representing the pattern 62 as a whole, the sewing machine 1 can also generate the processing line processing data of the pattern pieces 71, 72, 74, and 76 to 78 representing the margin pattern 67. The sewing machine 1 contributes to improving the user convenience when creating the patchwork of the shape 61 surrounding the desired pattern 62.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(A) The configuration of the sewing machine 1 may be changed as appropriate. The sewing machine 1 may be an industrial sewing machine or may be a multi-needle sewing machine. The present disclosure can be realized in various modes, and, for example, may be realized as a processing system or the like provided with the programs and the processing device 3. The processing data generation processing shown in FIG. 3 may be performed by a processing data generation device, other than the sewing machine 1, that is provided with a storage portion and a controller. The processing data generation device may be a dedicated device, a general-purpose PC, or a mobile terminal, such as a smartphone or the like. The processing device 3 need not necessarily be able to cut the workpiece W using the cutting blade 7, and may be a plotter capable of drawing on the basis of the drawing data, or a printer capable of printing on a sheet-shaped print medium, for example. When the processing device is the plotter, the processing data is the drawing data. When the processing device is the printing device, the processing data is print data. When the processing device is the plotter or the printing device, the user may create the plurality of sewing object pieces corresponding to the plurality of pattern pieces by drawing or printing the processing lines on the sewing object on the basis of the processing data, and manually cutting the sewing object along the processing lines. When the processing device is the plotter or the printing device, the user may draw or print the processing lines onto pattern paper on the basis of the processing data, and create the plurality of sewing object pieces corresponding to the plurality of pattern pieces using the pattern paper.

(B) The program including the instructions to execute the processing data generation processing shown in FIG. 3 and the sewing guide processing shown in FIG. 7 may be stored in a storage device of the sewing machine 1 until the program is executed by the controller 2. Thus, a program acquisition method, an acquisition path, and a device storing the program may be changed, respectively, as appropriate. The program executed by the controller 2 may be received from another device via cable or wireless communication, and may be stored in a storage device, such as a flash memory or the like. The other device includes a PC, and a server connected via a network, for example.

(C) Each of the steps of the processing data generation processing shown in FIG. 3 and the sewing guide processing shown in FIG. 7 is not limited to the example of being executed by the controller 2, and part or all of the processing may be executed by another electronic device (an ASIC, for example). Each of the steps of the processing data generation processing and the sewing guide processing may be executed by distributed processing by a plurality of electronic devices (a plurality of CPUs, for example). The order of each of the steps of the main processing may be changed, the step may be omitted, or a step may be added, as necessary. A mode in which part or all of the main processing is executed by an operating system (OS), or the like operated on the sewing machine 1 on the basis of instructions from the controller 2 is also included in the scope of the present disclosure. For example, the following changes may be added to the main processing as appropriate.

(C-1) In the processing data generation processing, the controller 2 may omit at least some of the processing at step S3, step S7, and step S8. After acquiring the pattern (step S5), the controller 2 may set the shape surrounding the acquired pattern. The controller 2 may omit step S1, and may set the predetermined distance D regardless of the type of the presser foot 22. The processing at step S16 may be omitted as appropriate. The controller 2 may omit the processing at step S16 for the pattern piece having a left-right symmetrical configuration around a center axis in the left-right direction of the pattern piece, or may perform the processing at step S16 for the pattern piece having the left-right symmetrical configuration. The reference for the processing at step S16 may be changed as appropriate, and an up-down inversion may be performed, for example. The controller 2 may omit at least one selected from the group of the processing at step S10, step S21, and step S22. At step S19, the controller 2 may set the processing lines with respect to the processing region R such that regions surrounded by the plurality of processing lines partially overlap with each other. The controller 2 may set the processing lines and the contour drawing lines in the mutually different processing regions R. In other words, the contour drawing line need not necessarily be disposed on the inside of one of the processing lines. At step S21, the contour drawing data may be data that draws some of the contours of the pattern pieces, and the contour drawing data need not necessarily include data that draws the identification information of the pattern pieces. The common pattern at step S12 may be changed as appropriate. When the cutting pattern is set as the common pattern, the cutting pattern need not necessarily be used for determining the positions of the ends of the two sewing objects. At step S11, the controller 2 may acquire the two pattern pieces regardless of whether or not there is the plurality of the adjacent pattern pieces with the edges that are targeted, among the contours of the pattern pieces.

Figure 10:
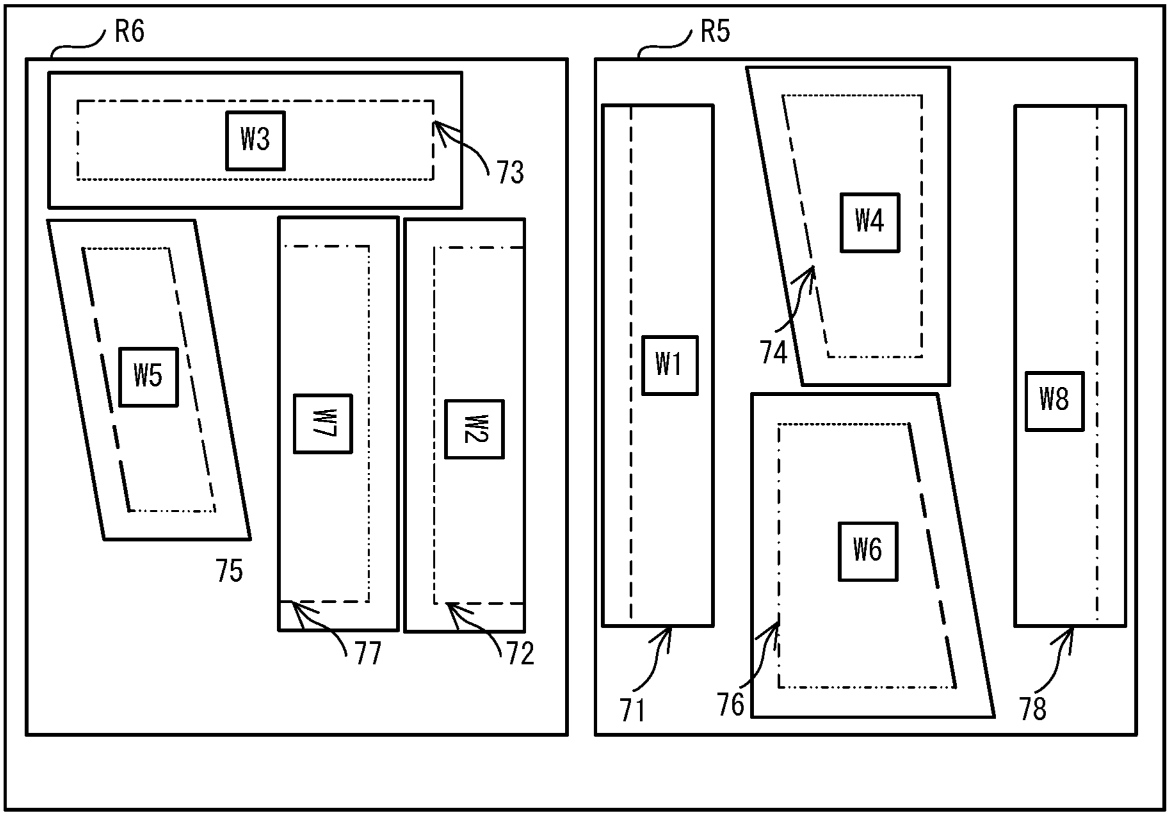
FIG. 10 is an explanatory diagram of the processing line processing data, the contour drawing data, and the identification drawing data according to a modified example.

(C-2) For the pattern 62 and the shape 61 of the specific example, the controller 2 may set the processing lines and the contour drawing lines as in processing regions R5 and R6 shown in FIG. 10, and may generate the processing line processing data, the contour drawing data, and the identification drawing data. Specifically, the controller 2 may omit the processing at step S15, and need not necessarily set the offset lines for the portions that do not include the adjacent portion, of the contours of the pattern pieces. In this case, it is sufficient that the controller 2 set the processing lines on the contours of the pattern pieces for the portions that do not include the adjacent portion. In FIG. 10, in the pattern pieces 71, 72, 77, and 78, the offset lines are not set for the portions that do not include the adjacent portion, and the processing lines are set on the contours. The controller 2 may omit the processing at step S12, and may set the offset lines in a specific shape at step S13 (a straight line segment, for example). The controller 2 may omit the processing at step S9, step S17, step S18, and step S23, and may generate each of the processing line processing data, the contour drawing data, and the identification drawing data without categorizing the plurality of pattern pieces 71 to 78 generated at step S6 and step S8 into the groups. At step S12, the controller 2 may set a drawing pattern that is common to the adjacent portions, in place of the cutting pattern, and may set the contour drawing data using line types that are mutually different depending on the adjacent portion, such as a dotted line, a one dot chain line, and the like. With respect to the regions R, the controller 2 may rotate the arrangement of the plurality of pattern pieces 71 to 78 in the processing regions R5 and R6 such that a number of the processing regions R is a minimum number. In FIG. 10, the pattern pieces 72 and 77 are disposed after being rotated by 90 degrees in the clockwise direction with respect to the processing region R6.

What is claimed is:

1. A processing data generation device, comprising:

a processor; and a memory configured to store computer-readable instructions that, when executed by the processor, instruct the processor to perform processes comprising:

acquiring processing of acquiring a pattern represented by a contour; division processing of dividing the pattern into a plurality of pattern pieces;

offset setting processing of setting an offset line, for each of two pattern pieces adjacent to each other from among the plurality of pattern pieces representing the pattern as a whole, the offset line being disposed at a position separated to an outside, from an adjacent portion, by a predetermined distance, the adjacent portion being a portion of the contour of a first piece, the first piece being one of the two pattern pieces, the adjacent portion being adjacent to a second piece, the second piece being another of the two pattern pieces, and the outside being opposite, with respect to the contour of the first piece, to a region surrounded by the contour of the first piece, processing line setting processing of setting, for each of the plurality of pattern pieces, a processing line including the offset line and surrounding a pattern piece from among the plurality of pattern pieces; and processing line processing of generating processing line processing data, for each of the plurality of pattern pieces, for processing a sheet-shaped workpiece along the processing line, using a processing device configured to perform processing on the workpiece; wherein the processing line processing includes generating, for at least some of the plurality of pattern pieces, from among the plurality of pattern pieces, as the processing line processing data, cutting data for cutting the workpiece, using the processing device, along the processing line set, with respect to the pattern piece, to be inverted in relation to a reference, and the computer-readable instructions further instruct the processor to perform a process comprising:

contour processing includes generating, for the at least some of the plurality of pattern pieces, contour drawing data for drawing, on the workpiece, a contour of the pattern piece inverted in relation to the reference.

2. The processing data generation device according to claim 1, wherein the offset setting processing includes setting, for each of the at least some of the plurality of pattern pieces, the offset line disposed at the position separated by the predetermined distance to the outside with respect to the contour of the first piece inverted in relation to the reference for the whole contour of the pattern piece, and the processing line setting processing includes setting, for each of the at least some of the plurality of pattern pieces, the offset line surrounding the pattern piece inverted in relation to the reference as the processing line.

3. The processing data generation device according to claim 1, wherein the processing device is configured to cut the workpiece using a cutting blade, and the processing line processing includes generating, as the processing line processing data, for each of the plurality of pattern pieces, cutting data for cutting the workpiece along the processing line using the processing device.

4. The processing data generation device according to claim 1, wherein the processing device is configured to draw on the workpiece using a pen, and the contour processing includes generating, for each of the plurality of pattern pieces, the contour drawing data for drawing, on the workpiece, —the contour of the pattern piece inverted in relation to the reference.

5. The processing data generation device according to claim 1, wherein the computer-readable instructions further instruct the processor to perform a process comprising:

categorization processing of categorizing the plurality of pattern pieces generated by the division processing into a plurality of groups, and the processing line processing includes generating, for each of the plurality of pattern pieces, the processing line processing data for processing the workpiece along the processing line, per group, using the processing device.

6. The processing data generation device according to claim 5, wherein the processing device is configured to draw on the workpiece using a pen, and the contour processing includes generating, for each of the at least some of the plurality of pattern pieces, the contour drawing data for drawing, on the workpiece, the contour of the pattern piece inverted in relation to the reference, per group.

7. The processing data generation device according to claim 1, wherein the computer-readable instructions further instruct the processor to perform a process comprising:

identification information processing of generating identification drawing data for drawing identification information, the identification information identifying the adjacent portion adjacent to the second piece, in each of the two pattern pieces adjacent to each other of the plurality of pattern pieces, and being common to the adjacent portion of the first piece and the adjacent portion of the second piece.

8. The processing data generation device according to claim 1, wherein the offset setting processing includes setting, in each of the two pattern pieces adjacent to each other, the offset line using a pattern common to the adjacent portion of the first piece and the adjacent portion of the second piece, at a position offset by the predetermined distance to the outside from the adjacent portion, of the contour of the pattern piece.

9. The processing data generation device according to claim 1, wherein the computer-readable instructions further instruct the processor to perform a process comprising:

shape setting processing of setting a shape encompassing the pattern, the division processing includes dividing a margin pattern into a plurality of pattern pieces, the margin pattern representing a portion between the pattern and the shape, the offset setting processing includes setting the offset line for each of the plurality of pattern pieces representing the pattern as a whole and for each of the plurality of pattern pieces representing the margin pattern as a whole, and the processing line processing includes generating the processing line processing data for each of the plurality of pattern pieces representing the pattern as a whole and for each of the plurality of pattern pieces representing the margin pattern as a whole.

10. A non-transitory computer-readable medium storing computer-readable instructions that are executed by a processor of a processing data generation device, the computer-readable instructions performing processes comprising:

acquiring processing of acquiring a pattern represented by a contour;

division processing of dividing the pattern into a plurality of pattern pieces;

offset setting processing of setting an offset line, for each of two pattern pieces adjacent to each other from among the plurality of pattern pieces representing the pattern as a whole, the offset line being disposed at a position separated to an outside, from an adjacent portion, by a predetermined distance, the adjacent portion being a portion of the contour of a first piece, the first piece being one of the two pattern pieces, the adjacent portion being adjacent to a second piece, the second piece being another of the two pattern pieces, and the outside being opposite, with respect to the contour of the first piece, to a region surrounded by the contour of the first piece, processing line setting processing of setting, for each of the plurality of pattern pieces, a processing line including the offset line and surrounding a pattern piece from among the plurality of pattern pieces; and processing line processing of generating processing line processing data, for each of the plurality of pattern pieces, for processing a sheet-shaped workpiece along the processing line, using a processing device configured to perform processing on the workpiece; wherein the processing line processing includes generating, for at least some of the plurality of pattern pieces, from among the plurality of pattern pieces, as the processing line processing data, cutting data for cutting the workpiece, using the processing device, along the processing line set, with respect to the pattern piece, to be inverted in relation to a reference, and the computer-readable instructions further instruct the processor to perform a process comprising:

contour processing includes generating, for the at least some of the plurality of pattern pieces, contour drawing data for drawing, on the workpiece, a contour of the pattern piece inverted in relation to the reference.

11. A sewing machine, comprising:

a presser bar configured to press a sewing object from above, a presser foot being configured to be mounted to a lower end portion of the presser bar;

a processor; and a memory configured to store computer-readable instructions that, when executed by the processor, instruct the processor to perform processes comprising:

acquiring processing of acquiring a pattern represented by a contour;

division processing of dividing the pattern into a plurality of pattern pieces;

predetermined distance setting processing of setting a predetermined distance depending on a type of the presser foot mounted to the lower end portion of the presser bar, offset setting processing of setting an offset line, for each of two pattern pieces adjacent to each other from among the plurality of pattern pieces representing the pattern as a whole, the offset line being disposed at a position separated to an outside, from an adjacent portion, by the predetermined distance, the adjacent portion being a portion of the contour of a first piece, the first piece being one of the two pattern pieces, the adjacent portion being adjacent to a second piece, the second piece being another of the two pattern pieces, and the outside being opposite, with respect to the contour of the first piece, to a region surrounded by the contour of the first piece, processing line setting processing of setting, for each of the plurality of pattern pieces, a processing line including the offset line and surrounding a pattern piece from among the plurality of pattern pieces; and processing line processing of generating processing line processing data, for each of the plurality of pattern pieces, for processing a sheet-shaped workpiece along the processing line, using a processing device configured to perform processing on the workpiece; wherein the processing line processing includes generating, for at least some of the plurality of pattern pieces, from among the plurality of pattern pieces, as the processing line processing data, cutting data for cutting the workpiece, using the processing device, along the processing line set, with respect to the pattern piece, to be inverted in relation to a reference, and the computer-readable instructions further instruct the processor to perform a process comprising:

contour processing includes generating, for the at least some of the plurality of pattern pieces, contour drawing data for drawing, on the workpiece, a contour of the pattern piece inverted in relation to the reference.

* * * * *